(12) United States Patent
Nijlunsing

(10) Patent No.: US 9,019,272 B2
(45) Date of Patent: Apr. 28, 2015

(54) CURVED PLANAR REFORMATION

(75) Inventor: Rutger Nijlunsing, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 462 days.

(21) Appl. No.: 13/394,555

(22) PCT Filed: Sep. 6, 2010

(86) PCT No.: PCT/IB2010/053994
§ 371 (c)(1),
(2), (4) Date: Mar. 7, 2012

(87) PCT Pub. No.: WO2011/030274
PCT Pub. Date: Mar. 17, 2011

(65) Prior Publication Data
US 2012/0169735 A1 Jul. 5, 2012

(30) Foreign Application Priority Data

Sep. 11, 2009 (EP) ..................... 09170066

(51) Int. Cl.
*G06T 15/08* (2011.01)
*G06T 19/00* (2011.01)
*G06T 11/00* (2006.01)

(52) U.S. Cl.
CPC ............ *G06T 19/00* (2013.01); *G06T 11/001* (2013.01); *G06T 15/08* (2013.01); *G06T 2215/06* (2013.01)

(58) Field of Classification Search
CPC . G06T 15/08; G06T 2215/06; G06T 2210/41; G06T 2207/30101; G06T 2207/30172; G06T 3/0037

USPC .......................... 345/419, 424; 382/128, 131
See application file for complete search history.

(56) References Cited

U.S. PATENT DOCUMENTS

| 6,331,116 | B1 * | 12/2001 | Kaufman et al. | ............. 434/262 |
| 2003/0216626 | A1 | 11/2003 | Tsujita et al. | |
| 2005/0010100 | A1 * | 1/2005 | Hornegger et al. | ........... 600/407 |
| 2005/0226484 | A1 | 10/2005 | Basu et al. | |
| 2006/0062447 | A1 | 3/2006 | Rinck et al. | |

(Continued)

FOREIGN PATENT DOCUMENTS

| EP | 1994876 A1 | 11/2008 |
| WO | 2006123309 A2 | 11/2008 |
| WO | 2009019640 A2 | 2/2009 |

OTHER PUBLICATIONS

David Willilams et al, "Volumetric Curved Planar Reformation for Virtual Endoscopy", IEEE Transactions on Visualization and Computer Graphics, vol. 14, No. 1, Jan./Feb. 2008, pp. 109-119.

(Continued)

*Primary Examiner* — Carlos Perromat

(57) ABSTRACT

Curved Planar Reformation (CPR), producing a Curved Planar Reformat, is a technique to provide a representation of an anatomical structure which is curved through a 3D volume. This reformation process can result in image artifacts, leaving it up to the user to determine what are artifacts and what are actual anatomical features. The invention provides assistance to the user by detecting areas of potential ambiguity during the CPR procedure, and distinguishing these areas on the display to the user. In this way, the user no longer needs detailed knowledge of how the CPR is performed.

20 Claims, 4 Drawing Sheets

(56) References Cited

U.S. PATENT DOCUMENTS

2009/0225077 A1\* 9/2009 Sudarsky et al. ............ 345/423
2009/0298017 A1\* 12/2009 Boerjes et al. ............... 433/214

OTHER PUBLICATIONS

Anna Vilanova Bartroli et al, "Nonlinear Virtual Colon Unfolding", Proceedings IEEE, Jan. 1, 2001, p. 411-579.

\* cited by examiner

CURVED PLANAR REFORMATION

FIELD OF THE INVENTION

The invention relates to a system and method for displaying a curved planar reformation plane.

BACKGROUND OF THE INVENTION

Curved Planar Reformation (CPR), producing a Curved Planar Reformat, is a technique to provide a representation of an anatomical structure which is curved through a 3D volume. Using conventional display techniques, where a representation of a plane is generated from image slices, problems arise because very few anatomical structures lie in such a plane. For example, the colon has a highly curved shape, so that many planes need to be represented to visualize its structure. Additionally in virtual endoscopy, the user would like to move along an anatomical structure—with conventional display techniques, this would require a continuous repositioning of images as the user moves through the stack of image slices. An example of virtual endoscopy using CPR is described in "Volumetric Curved Planar Reformation for Virtual Endoscopy", Williams, Grimm, Coto, Roudsari, Hatzakis, IEEE Transactions on Visualization & Computer Graphics, Vol. 14, No. 1, January/February 2008.

In general, CPR visualization may be used to visualize any elongated object of interest in a 3D volume. Typically, CPR is used in CT/MR angiography to visualize arterial and venous vessels, and also in the orthopedic domain to visualize the spinal cord.

FIGS. 3A, 3B and 3C illustrate an example of three steps in a conventional CPR procedure. FIG. 3A depicts a 3D image data volume 200 comprising an elongated anatomical structure. A line 210 is defined along the longitudinal axis of the anatomical structure. A construction plane 220 is defined. FIG. 3B depicts the same 3D image data volume 200 in which a reformat plane 230 has been defined orthogonally to the construction plane 220. The reformat plane 230 also comprises the line 210. FIG. 3C depicts a schematic representation of the curved plane view 240 as provided to the user, in which the line 210 is unfolded onto the screen and the reformat plane 230 is flattened for viewing.

The CPR procedure proceeds as follows. In FIGS. 3A, 3B image data volume 200 is acquired. A line 210 through the anatomical structure is determined—this may be done automatically, or in combination with input from the user. If it is done automatically, it may be advantageous to first segment the contours of the anatomical structure. The determination of the line may include not only the line 210 itself, but also the start and end points of interest. Typically, this line approximates a centerline through the anatomical object. A suitable construction plane 220 is chosen proximate the line 210, either automatically or in combination with input from the user.

As shown in FIG. 3B, a curved reformat plane 230 is then determined, orthogonal to the construction plane 220 through the line 210. Finally, in FIG. 3C, the reformat plane 230 is folded out, and flattened. A representation of the anatomical structure along the line 210 is then displayed to the user on the display. This is a 2D image giving the curved plane view 240. As this line 210 is defined along the anatomical structure, the procedure allows a larger portion of the anatomical structure to be viewed at once.

Other CPR techniques, such as projection CPR, stretched CPR and straightened CPR, are known in the art, such as in the Williams et al. article. What they all have in common is that they "unfold" an elongated anatomical structure onto the screen by determining a curved plane through the structure, and displaying this curved plane.

This reformation process can result in image artifacts, leaving it up to the user to distinguish between artifacts and actual anatomical features.

SUMMARY OF THE INVENTION

It is an object of the invention to provide a system and method for displaying a curved planar reformation plane.

The invention is defined by the independent claims. Advantageous embodiments are defined in the dependent claims.

According to a first aspect of the invention, a system is provided for displaying a curved planar reformation plane, comprising:

an imager configured to provide imaging data comprising the representation of an anatomical structure;

a determiner configured to determine a line through the anatomical structure;

a curved planar reformatter configured to:

determine the reformation plane at a plurality of positions along the line; and determine for one or more voxels in the imaging data the likelihood that the voxel will be comprised in more than one location of the reformation plane;

a display configured to display a representation of the anatomical structure in the reformation plane, and further configured to distinguish the one or more voxels if the likelihood deviates from a predetermined value or range of values.

The invention is based upon the insight that the CPR procedure can result in displaying an anatomical feature more than once. For example, a single branch of a vessel can be shown as multiple branches, which makes it easy to misinterpret the reformation. This is also called mirroring, and can even be so severe that the topology of the structure is not clear anymore.

For the user it is difficult to distinguish between artifacts and actual anatomical features. Extensive knowledge of the underlying algorithm is required in order to be able to distinguish possible artifacts from pathology. Any ambiguity is left to interpretation by the user who has to fall back on interaction with the image, like rotation and panning, to inspect the anatomy. Even this is no guarantee of the correct interpretation.

The invention provides assistance to the user by detecting areas of potential ambiguity during the CPR procedure, and distinguishing these areas on the display to the user. In this way, the user no longer needs detailed knowledge of how the CPR is performed.

According to a further aspect of the invention, the curved planar reformatter is configured to determine the curvature of the line at a position proximate the one or more voxels, and to determine the likelihood using the curvature.

This is based on the insight that at locations where the curvature is high, the line takes a sharp turn within the 3D image data volume, and hence it is a more likely place for the one or more voxels to be displayed more than once. At positions along the line with a high curvature, there is a higher likelihood of the curved plane reformat intersecting itself.

The curved planar reformatter may be additionally or alternatively configured to determine voxels comprised in the reformation plane at a plurality of positions along the line, and to determine the likelihood using the number of positions where the one or more voxels was comprised in the reformation plane.

In this way, the incidence and extent of areas where the curved plane reformat intersects itself may be determined.

The curved planar reformatter may be additionally or alternatively configured to determine a plurality of distances between the one or more voxels and a plurality of positions along the line, and to determine the likelihood using the number of positions where the distance deviates from a second predetermined value or range of values.

This is based on the insight that the likelihood of the one or more voxels being comprised more than once in the curved planar reformat may be related to the proximity to the line through the anatomical structure. When a voxel is close to more than one point along the line, the voxel may be included more than once. By measuring the distance of the voxel from a plurality of points along the line, and determining the number of points within a predetermined value, the likelihood can be determined.

In another aspect of the invention, the system further comprises a segmenter (330) configured to receive the imaging data and segment the imaging data to determine the contours of the anatomical structure.

By segmenting the imaging data, the determiner may operate automatically to determine the line through the anatomical structure. Alternatively, the operation may be highly automated, requiring the user only to indicate a seed voxel for the segmentation.

In another aspect of the invention, the system may be comprised in a workstation or in the medical imaging acquisition apparatus used to acquire the imaging data.

According to a still further aspect of the invention, a method is provided for displaying a curved planar reformation plane, comprising:

providing imaging data of an anatomical structure;

determining a line through the anatomical structure;

determining the reformation plane at a plurality of positions along the line; and determining for one or more voxels in the imaging data the likelihood that the voxel will be comprised in more than one location of the reformation plane;

displaying a representation of the anatomical structure in the reformation plane, and distinguishing the one or more voxels if the likelihood deviates from a predetermined value or range of values.

According to another aspect of the invention, a computer program product is provided for carrying out a method of the invention, when loaded and run on a computer.

It will also be obvious to the skilled person that the invention does not need to be limited to any particular modality to obtain the imaging data. For example, it may be used with X-ray Imaging, Computed Tomography (CT), Magnetic Resonance Imaging (MRI), Positron Emission Tomography (PET), Single Photon Emission Computed Tomography (SPECT) and Nuclear Medicine (NM)

BRIEF DESCRIPTION OF THE DRAWINGS

These and other aspects of the invention are apparent from and will be elucidated with reference to the embodiments described hereinafter.

In the drawings.

The Figures are purely diagrammatic and not drawn to scale. Particularly for clarity, some dimensions are exaggerated strongly. Similar components in the Figures are denoted by the same reference numerals as much as possible.

DETAILED DESCRIPTION OF THE PREFERRED EMBODIMENTS

Figure 1:
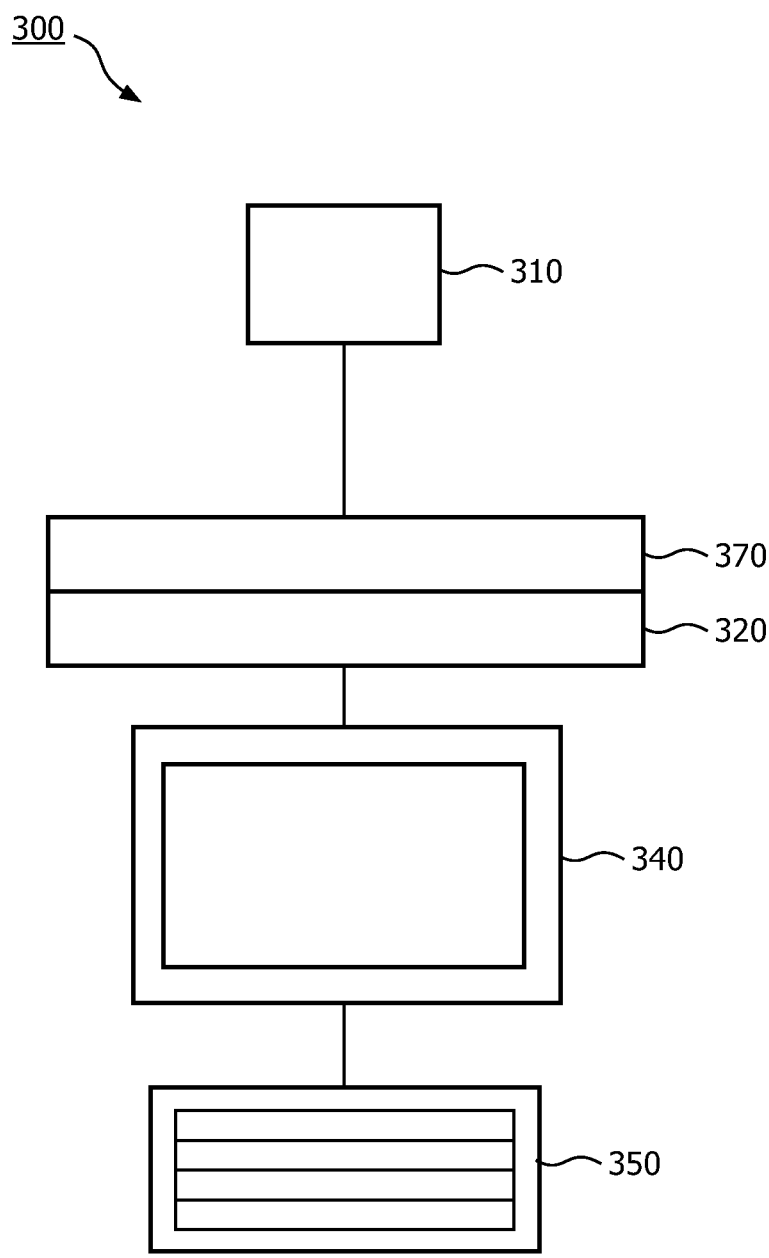
FIG. 1 shows a schematic diagram of the system according to the invention.
Figure 2:
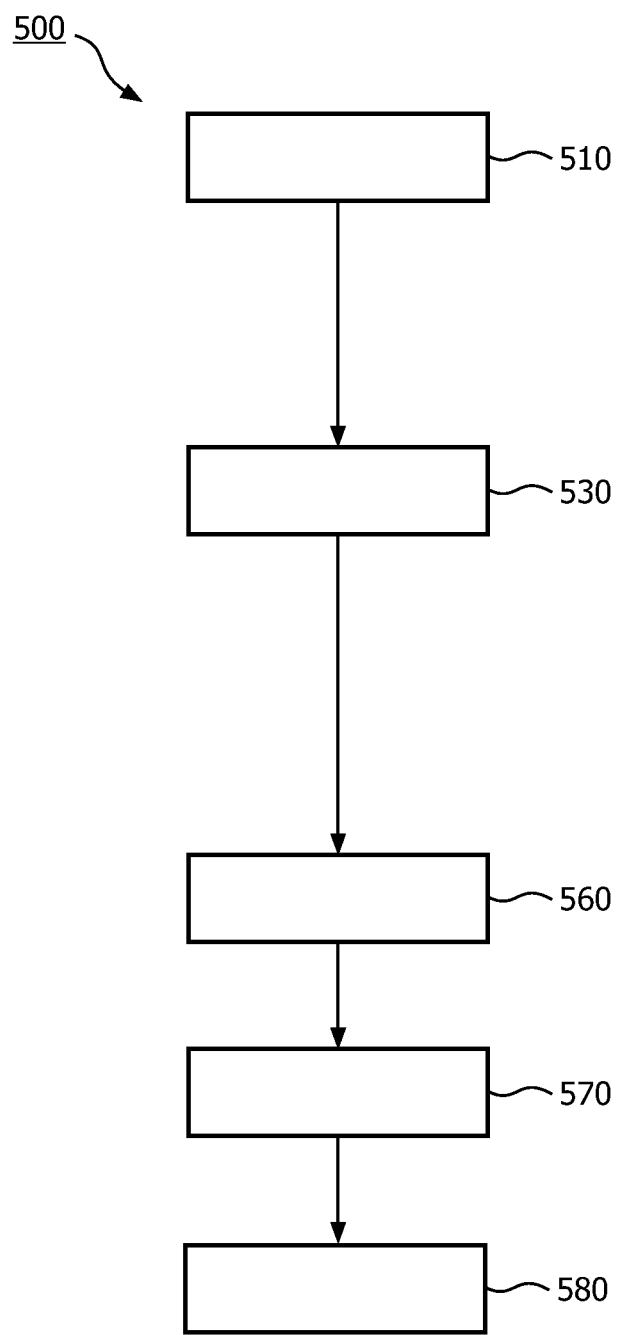
FIG. 2 depicts the method according to the invention.

A system 300 for displaying a curved planar reformation plane is depicted in FIG. 1. The system 300 comprises:

an imager 310 configured to provide imaging data comprising the representation of an anatomical structure. For example, the imaging data is acquired using MRI or CT scans. The imager 310 may be configured to receive the imaging data in real-time, or the imaging data may be retrieved from a data storage facility.

a determiner 370 configured to determine a line through the anatomical structure. This may be performed manually by the user. Alternatively, this may be performed automatically or semi-automatically if the contours of the anatomical model are first segmented in the image data. In a semi-automatic embodiment, the user may assist the determiner by selecting one of more points along the line;

a curved planar reformatter 320 configured to determine the reformation plane at a plurality of positions along the line, and to determine for one or more voxels in the imaging data the likelihood that the voxel will be comprised in more than one location of the reformation plane;

a display 340 configured to display a representation of an anatomical structure in the reformation plane, and further configured to distinguish the one or more voxels if the likelihood deviates from a predetermined value or range of values. The value for the predetermined value or range of values may be based upon a theoretical knowledge of the CPR procedure used, or it may be determined by trial and error. For example, if the skilled person has identified a region with a mirror defect, he is perfectly capable of operating the invention multiple times with different values to determine an optimum value or an optimum range of values. It may be advantageous to provide predetermined values for different anatomical structures, as this may provide a more accurate and intuitive display to the user. In this case, the display is then provided with an identification of the anatomical structure of interest, so that the correct distinguishing value or range of values may be employed.

Figure 3A:
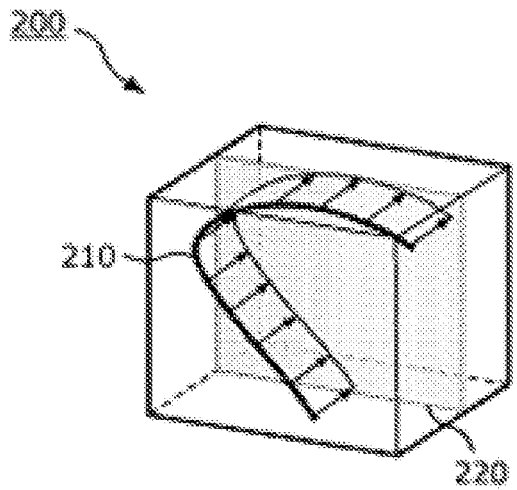
FIGS. 3A, 3B and 3C depict a CPR procedure known in the art.
Figure 3B:
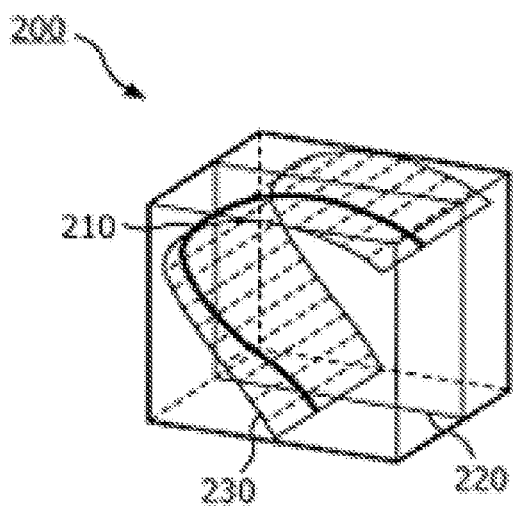
Figure 3C:
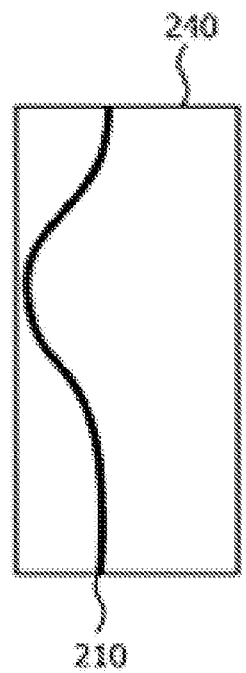

Any CPR procedure known in the art may be utilized in the invention, such as the one described with reference to FIG. 3, or others such as projected, stretched or straightened CPR. For example, the curved planar reformatter 320 may be configured to determine a viewing plane and to determine the reformation plane perpendicular to the projection plane at a plurality of positions along the line.

Figure 4:
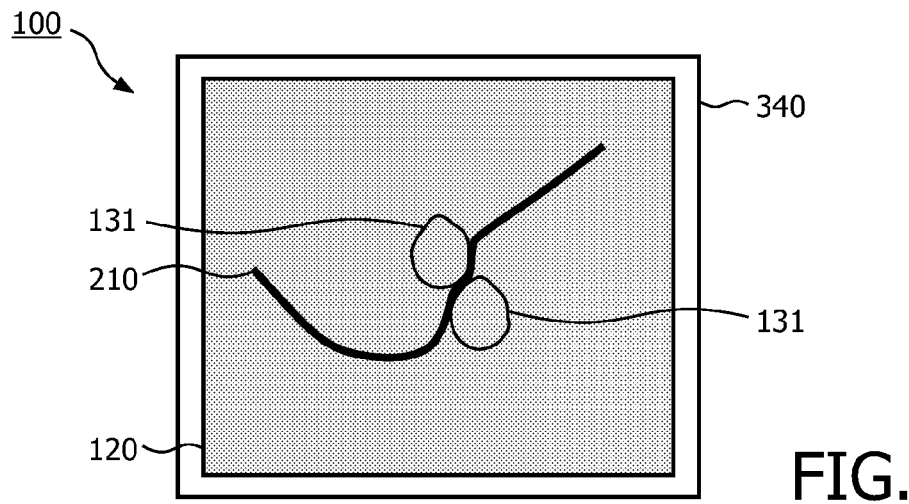
FIG. 4 shows a schematic representation of CPR output depicting artifacts.

The inventors have realized that CPR procedures can result in a particular kind of artifact, resulting in an anatomical feature being displayed more than once. An example is depicted in FIG. 4—a curved plane reformation 100 is provided on the display 340. The reformation 100 comprises a grayscale image 120 of a curved plane, in which contours 210 of an anatomical structure of interest are depicted. The anatomical structure is a curved arterial vessel. In particular, two artifacts are depicted—two circular contours 131 are depicted on either side of the structure contours 210, at a position along a curve in the structure contours.

The invention is based on the insight that the CPR procedure inherently suffers from the danger of overlaps. In other words, two parts of the curved reformat plane may intersect the same part of the anatomical structure, making this part visible twice in the curved plane reformation 100. Therefore, for curved and crooked anatomical structures, the CPR plane can intersect with itself.

By performing an extra calculation during the CPR procedure, namely configuring the determiner 370 to determine the likelihood that voxels in the imaging data will be comprised in more than one location in the reformation plane, areas of the imaging data sensitive to artifacts may be identified. When the CPR image of the anatomical structure is displayed to the user, these areas may be distinguished in any convenient way.

Determination of the likelihood may be performed in a number of ways. For example, the skilled person may initially generate probability models from multiple sets of imaging data. By generating CPR images and manually indicating mirroring artifacts, a reference library may be generated, indicating regions of particular anatomical structures where the likelihood of a mirroring artifact is higher. Then, when processing subsequent data sets, it is sufficient to configure the CPR reformatter 320 to determine that a position along the line is in such a region of the anatomical structure with a higher likelihood.

It may be advantageous to provide probability models for different anatomical structures, as this may increase the accuracy of the likelihood determination. In this case, the CPR reformatter is then provided with an identification of the anatomical structure of interest so that the correct probability model may be employed.

In another example, the curved planar reformatter may be configured to determine voxels comprised in the reformation plane at a plurality of positions along the line, and to determine the likelihood, using the number of positions where the one or more voxels are comprised in the reformation plane. A possible implementation of this is to keep track of the voxels comprised in each iteration of the CPR as the reformat plane is determined at a plurality of positions along the line. The reformatter may then check how often each voxel is comprised in the different iterations of the reformat plane. The parameters used for the determination of the likelihood may be optimized by the user depending upon such things as personal preference, the nature of the investigation, the anatomical structure, or the region of interest of the anatomical structure. For example, the number of times a voxel may be comprised in the reformat plane may be set to 1. All voxels with likelihood values larger than 1 will be distinguished when the CPR view is displayed to the user.

It may be advantageous to reduce the amount of data which has to be processed and retained, so that the computing power required is reduced. For example, the extent of adjacent voxels, such as volume or area, may be used to limit the likelihood to only larger regions which are to be distinguished.

Additionally or alternatively, the likelihood may be determined using the curvature of the line. After having determined the path of the spatial coordinates of the line through the 3D image data, a relatively simple algorithm may be used to determine values of curvature along the line. A high curvature value at a point along the line indicates a higher likelihood of the reformat plane comprising at that point voxels already comprised in another part of the plane.

The value that the user wishes to use as the threshold for distinguishing on the display may be selected based upon such things as personal preference, the nature of the investigation, the anatomical structure, or the region of interest of the anatomical structure.

The skilled person may also initially generate curvature models from multiple sets of image data. By generating CPR images and manually indicating mirroring artifacts, a reference library may be generated, indicating curvatures that may result in mirroring artifacts. By virtue thereof, when processing subsequent data sets, it is sufficient to configure the CPR reformatter 320 to determine the curvature, and then use the curvature models to determine the likelihood.

It may be advantageous to provide curvature models for different anatomical structures, as this may increase the accuracy of the likelihood determination. In this case, the CPR reformatter is then provided with an identification of the anatomical structure of interest, so that the correct curvature model may be employed.

It may be advantageous to take into account the orientation of the curvature relative to the orientation of the CPR plane, as the same orientation of the curvature and the CPR plane will most likely result in overlaps.

Additionally or alternatively, the likelihood may be determined using proximities—in other words, a plurality of distances between each voxel and multiple positions along the line. Once these measurements have been determined, the likelihood of appearing more than once in the CPR plane may be related to the number of positions where the distance deviates from a second predetermined value or range of values. If a voxel is within a certain distance of a number of positions on the line, the probability of it being comprised within more than one part of the reformat plane is higher. An extreme case that may be encountered is a voxel encircled by a CPR reformat plane.

The magnitude of the second predetermined value or range of values may be based upon theoretical knowledge of the CPR procedure used, or it may be determined by trial and error. For example, if the skilled person has identified a region with a mirror defect, he is perfectly capable of operating the invention multiple times with different values to determine an optimum value or an optimum range of values.

The skilled person may also initially generate proximity models from multiple sets of image data. By generating CPR images and manually indicating mirroring artifacts, a reference library may be generated, indicating the proximity values or range of values that may result in mirroring artifacts. By virtue thereof, when processing subsequent data sets, it is sufficient to configure the CPR reformatter 320 to determine the proximities, and then use the proximity models to determine the likelihood.

It may be advantageous to provide proximity models for different anatomical structures, as this may increase the accuracy of the likelihood determination. In this case, the CPR reformatter is then provided with an identification of the anatomical structure of interest, so that the correct proximity model may be employed.

It will be apparent to the skilled person that the likelihood may be determined using any convenient combination of the parameters mentioned above. For example, as a curvature is a parameter that is relatively quick and simple to determine, this may be used as an initial filter to determine very roughly areas of potential ambiguity. Once these areas have been determined, the curved planar reformatter may perform a more intensive analysis such as determining for the voxels in those rough areas whether they are comprised more than once in the CPR plane.

In another example, proximity may be used as an initial filter to determine very roughly areas of potential ambiguity. Once these areas have been determined, the curved planar reformatter may perform a more intensive analysis such as determining for the voxels in those rough areas whether they are comprised more than once in the CPR plane.

It is also envisioned that multiple parameters may be combined to generate a composite likelihood. It will be obvious to the skilled person that by assigning customizable weights to each contribution to the composite likelihood, the user is provided with a powerful, flexible tool to predict mirroring artifacts, which may be adapted for any elongated anatomical structure.

Figure 5A:
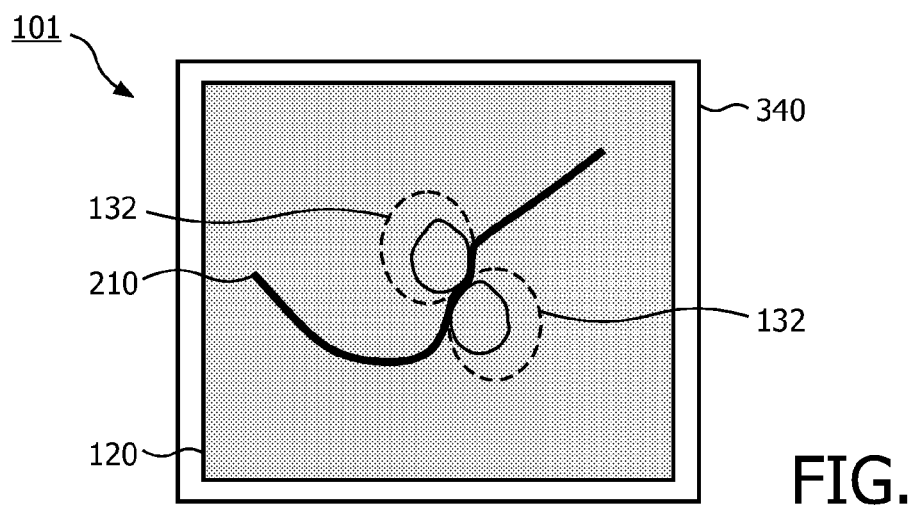
FIGS. 5A and 5B show two possible ways of indicating possible artifacts according to the invention.
Figure 5B:
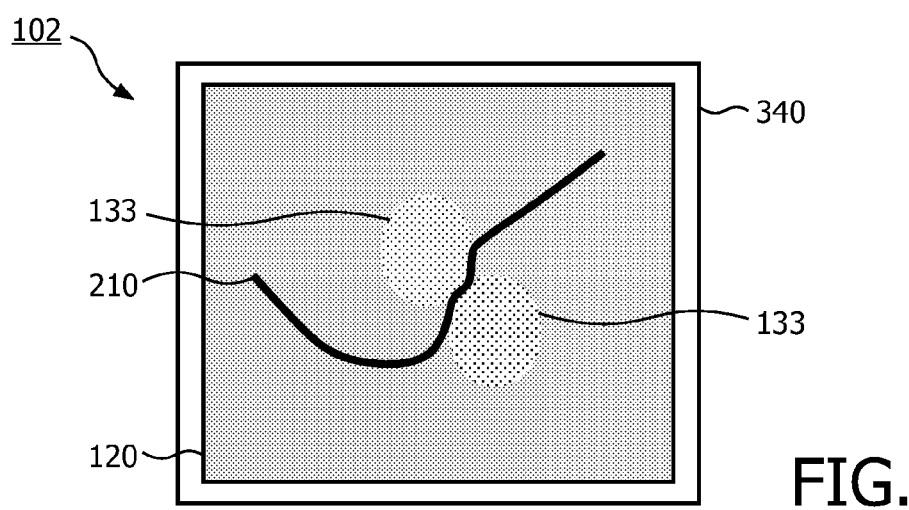

Once the mirroring artifact has been predicted, it is distinguished to the user. For example, FIGS. 5A and 5B show two examples of how the areas may be distinguished. Both FIGS. 5A and 5B depict CPR reformations 101, 102, respectively, of contours 210 of the same anatomical structure as depicted in FIG. 4, and both similarly suffer from the two circular artifacts 131.

In FIG. 5A, the voxels determined to have a high likelihood of appearing in more than one location, are overlaid with a distinguishing mark 132, such as a red area. As will be obvious to the skilled person, any suitable technique may be employed to distinguish voxels with a high likelihood, such as circling, hatching, shading, or the use of pointers which may be static or flashing.

In FIG. 5B, the same voxels have been processed to reduce 133 the intensity of the circular contour 210, so that the voxels are less, or no longer, visible to the user. In other words, the contour 210 has been darkened to divert the user's attention away from this area.

Alternatively, the degree of likelihood may be translated to a color or shading palette, so that graduations in likelihood are also distinguished to the user.

An anatomical structure should also be interpreted broadly. For example, a reference structure may be an organ, a part of an organ, a lobe of an organ, a skeletal bone, a part of a skeletal bone, a muscle, a part of a muscle, a lymph node, part of a lymph node, a nerve, part of a nerve, a vessel, and part of a vessel. Such a structure may also include a tumor, a primary tumor, a metastatic tumor, a cyst, a pseudocyst, a neoplasm, a lymph node, a lymphoma fibroid, and a nevus.

The system is configured for performing the method of the invention, i.e. displaying a curved planar reformation plane. The method comprises:

providing 510 imaging data of an anatomical structure;
determining 530 a line through the anatomical structure;
determining 560 the reformation plane at a plurality of positions along the line; and
determining 570 for one or more voxels in the imaging data the likelihood that the voxel(s) will be comprised in more than one location of the reformation plane;
displaying 580 a representation of the anatomical structure in the reformation plane, and distinguishing the one or more voxels if the likelihood deviates from a predetermined value or range of values.

Although the method 500 may be performed completely automatically, it is also envisioned that the method 500 may be implemented such that the user operating the invention is prompted to make a selection from a limited number of choices. In other words, the method is highly-automated. This may also reduce the computational power required. For example, at suitable points during the CPR procedure, a pull-down menu may be presented or the healthcare professional may be prompted to select one of several alternatives annotated on a display of the imaging data. An intermediate embodiment is also envisioned where sections of the CPR procedure are performed automatically, punctuated by infrequent manual selections.

Additionally, it is envisioned that the user may be provided with user input controls 350 to enter any required or desired data, such as to identify the anatomical structure of interest, select appropriate models, or provide any predetermined values or range of values required.

The skilled person, provided with the details of the methods disclosed, will be able to implement a computer program to carry out these methods when loaded and run on a computer.

A user may use a workstation to perform these interactions, for example during image acquisition and image viewing. The workstation may then comprise the system according to the invention. It is also envisioned that the system 300 may be comprised in a medical image acquisition apparatus.

The invention may be summarized as follows.

Curved Planar Reformation (CPR), producing a Curved Planar Reformat, is a technique to provide a representation of an anatomical structure which is curved through a 3D volume. This reformation process can result in image artifacts, leaving it up to the user to determine what are artifacts and what are actual anatomical features. The invention provides assistance to the user by detecting areas of potential ambiguity during the CPR procedure, and distinguishing these areas on the display to the user. In this way, the user no longer needs detailed knowledge of how the CPR is performed In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer.

In the system claim enumerating an imager, a determiner, a curved planar reformatter, and a display, several of these means may be embodied by one and the same item of hardware.

The mere fact that certain measures are recited in mutually different dependent claims does not indicate that a combination of these measures cannot be used to advantage.

The invention claimed is:

1. A system for displaying a curved planar reformation plane, comprising:
    an imager configured to provide imaging data of an anatomical structure;
    a determiner configured to determine a line through the anatomical structure;
    a curved planar reformatter configured to:
        determine the curved planar reformation plane at a plurality of positions along the line; and
        determine for one or more voxels in the imaging data a likelihood that the voxel(s) will be comprised in more than one location of the reformation plane;
    a display configured to display a representation of the anatomical structure in the reformation plane, and further configured to distinguish the one or more voxels if the likelihood deviates from a predetermined value or range of values.

2. The system of claim 1, wherein
    the curved planar reformatter is further configured to:
        determine the curvature of the line at a position proximate the one or more voxels, and determine the likelihood using the curvature.

3. The system of claim 1, wherein:
the curved planar reformatter is further configured to:
determine voxels comprised in the reformation plane at a plurality of positions along the line, and determine the likelihood using the number of positions where the one or more voxels are comprised in the reformation plane.

4. The system of claim 1, wherein
the curved planar reformatter is further configured to:
determine a plurality of distances between the one or more voxels and a plurality of positions along the line, and determine the likelihood using the number of positions where the distance deviates from a second predetermined value or range of values.

5. The system of claim 1, wherein the system further comprises:
a user input configured to provide to the determiner one or more points on the line.

6. The system of claim 1, wherein the system further comprises:
the determiner being configured to determine one or more points on the line automatically.

7. The system of claim 1, wherein the system further comprises a segmenter configured to receive the imaging data and to segment the imaging data to determine the contours of the anatomical structure.

8. The system for displaying a curved planar reformation plane according to claim 1, further comprising:
a reference library of proximity models which include proximity values resulting in mirroring artifacts; and
wherein the curved planar reformatter is further configured to determine a proximity between the voxel(s) and positions of the voxels(s) along the line and use the reference library to determine the likelihood that the voxel(s) will be comprised in more than one location of the reformation plane.

9. The system for displaying a curved planar reformation plane according to claim 8, wherein the likelihood increases for the voxel(s) with positions along the line within a predetermined distance.

10. The system for displaying a curved planar reformation plane according to claim 8, wherein the curved planar reformatter filters the voxels(s) based on the determined proximity.

11. The system for displaying a curved planar reformation plane according to claim 8, wherein the proximity models are differentiated by anatomical structure and the curved planar reformatter is further configured to receive an identity of an anatomical structure of interest and select proximity models from the reference library based on the received identity.

12. The system for displaying a curved planar reformation plane according to claim 1, further comprising:
a reference library of curvature models of anatomical structures which include curvatures resulting in mirroring artifacts; and
wherein the curved planar reformatter is further configured to determine a curvature of an anatomical structure relative to the reformation plane and use the reference library to determine the likelihood that the voxel(s) will be comprised in more than one location of the reformation plane.

13. The system for displaying a curved planar reformation plane according to claim 12, wherein the curvature models are differentiated by anatomical structure and the curved planar reformatter is further configured to receive an identity of an anatomical structure of interest and select curvature models from the reference library based on the received identity.

14. The system for displaying a curved planar reformation plane according to claim 13, wherein the identity includes at least one of: a vessel, a part of a vessel, an organ, a part of an organ, a bone, a part of a bone, a muscle, a part of a muscle, a lymph node, a part of a lymph node, a nerve, a part of a nerve, a tumor, a cyst, a pseudocyst, a neoplasm, a lymphoma fibroid, or a nevus.

15. The system for displaying a curved planar reformation plane according to claim 12, wherein the curvature of the anatomical structure relative to the reformation plane include an orientation of the curvature of the anatomical structure and an orientation of the curvature of the reformation plane.

16. The system for displaying a curved planar reformation plane according to claim 1, wherein the one or more voxels are distinguished using at least one of circling, hatching, shading or pointers.

17. The system for displaying a curved planar reformation plane according to claim 1, wherein the one or more voxels are distinguished with a lower intensity.

18. A workstation or a medical imaging acquisition apparatus comprising the system according to claim 1.

19. A method of displaying a curved planar reformation plane, comprising:
providing imaging data of an anatomical structure;
determining a line through the anatomical structure;
determining the reformation plane at a plurality of positions along the line; and
determining for one or more voxels in the imaging data a likelihood that the voxel(s) will be comprised in more than one location of the reformation plane;
displaying a representation of the anatomical structure in the reformation plane, and distinguishing the one or more voxels if the likelihood deviates from a predetermined value or range of values.

20. A non-transitory computer readable medium encoded with a computer program, wherein the computer program, in response to being executed by a processor, causes the processor to:
provide imaging data of an anatomical structure;
determine a line through the anatomical structure;
determine the reformation plane at a plurality of positions along the line; and
determine for one or more voxels in the imaging data a likelihood that the voxel(s) will be comprised in more than one location of the reformation plane;
display a representation of the anatomical structure in the reformation plane, and distinguishing the one or more voxels if the likelihood deviates from a predetermined value or range of values.

* * * * *